United States Patent Office 3,551,574
Patented Dec. 29, 1970

3,551,574
METHODS OF COMBATTING FUNGI USING HYDROAROMATIC HYDROXAMIC ACIDS
Paul-Ernst Frohberger, Burscheid, Engelbert Kühle, Bergisch Gladbach, and Ewald Urbschat, Cologne-Mulheim, Germany, assignors to Farbenfabriken Bayer Aktiengesellschaft, Leverkusen, Germany, a corporation of Germany
No Drawing. Filed May 31, 1966, Ser. No. 553,690
Claims priority, application Germany, June 5, 1965, F 46,270
Int. Cl. A01n 9/20, 9/24
U.S. Cl. 424—311
11 Claims

ABSTRACT OF THE DISCLOSURE

Fungitoxic preparation in the form of a mixture of a dispersible finely divided solid and/or a dispersible liquid containing a surface-active agent, and a fungitoxic amount of a hydroaromatic hydroxamic acid or alkali metal salt thereof, and methods of combatting fungi therewith.

---

The present invention relates to particular hydroxamic acids, some of which are known, which are derived from hydroaromatic carboxylic acids, and also which possess valuable fungitoxic properties, to their fungitoxic compositions with dispersible carrier vehicles, and to new methods for the production and use thereof.

It is already known that thiuram disulfides, especially tetramethyl thiuram disulfide (A), and bis-dithio carbamates, especially zinc ethylene-1,2-bis-dithiocarbamate (B), can be used for combatting phytophathogenic fungi.

It is also known that organic mercury compounds, especially methoxyethyl-mercury silicate (C), can be used as fungicidally active compounds. These compounds are particularly suitable for seed dressing. They have the highest fungicidal activity so far achieved, but they have the very great disadvantage of being highly toxic towards warm-blooded animals. Because of their high toxicity, there is an urgent need for replacing these seed dressings with other dressings of lower toxicity towards warm-blooded animals.

It is further known that certain open chain hydroxamic acids, for example, the copper salt of pivalic-hydroxamic acid (D), as well as sorbic-hydroxamic acid (E), can be used as fungitoxically active compounds (British Pat. No. 894,120 and French Pat. No. 1,332,149).

It is an object of the present invention to provide certain particular new hydroaromatic hydroxamic acids which possess valuable fungicidal properties; to provide active compositions of particular hydroaromatic hydroxamic acids, some of which are known, in the form of mixtures of such compounds with solid and liquid dispersible carrier vehicles; to provide a process for producing such compounds; and to provide methods of using such compounds in a new way, especially for combatting fungi.

Other and further objects of the present invention will become apparent from a study of the within specification and accompanying examples.

It has now been found in accordance with the present invention that particular hydroaromatic hydroxamic acids, some of which are known, having the formula:

$$R-\overset{O}{\underset{\|}{C}}-NH-OX \qquad (I)$$

in which R represents a member selected from the group consisting of hydroaromatic hydrocarbon containing 6–7 ring carbon atoms and substituted hydroaromatic hydrocarbon containing 6–7 ring carbon atoms which is substituted with a member selected from the group consisting of alkyl having 1–4 carbon atoms, alkoxy having 1–4 carbon atoms, alkanoyloxy having 1–4 carbon atoms, and hydroxy, and X represents hydrogen or an equivalent of a metal, e.g. alkali metal possesses strong fungitoxic properties.

It is very surprising that the hydroxamic acids usable according to the present invention have a higher fungi-toxic activity than tetramethyl thiuram disulfide, zinc ethylene-bis-dithio carbamate, the copper salts of pivalic-hydroxamic acid and sorbic-hydroxamic acid. It is also surprising that the hydroxamic acids usable according to the invention, while having a very low toxicity towards warm-blooded animals, have a fungi-toxic activity which is as high as that of the organic mercury compounds used for seed dressing. The active compounds according to the present invention thus constitute a valuable addition to the art.

Examples of particular hydroxamic acid compounds which can be used according to the present invention include tetrahydrobenzohydroxamic acid, hexahydrobenzohydroxamic acid, 2,5-endomethylene-tetrahydrobenzohydroxamic acid, hexahydrotoluylhydroxamic acid, hexahydro-4-methoxy-benzohydroxamic acid, hexahydro-2-acetoxy-benzohydroxamic acid, 2-hydroxy-5-tert.-butyl-hexahydrobenzohydroxamic acid, and the like.

Some of the hydroxamic acids usable for the purposes of the present invention are known, but, of course, they have not been disclosed heretofore as usable for the instant purposes. Those hydroxamic acids which are new, such as hexahydrobenzohydroxamic acid, can be prepared in a simple manner by known methods.

The instant hydrogenated benzohydroxamic acids are obtained in an especially advantageous manner, in accordance with the present invention, by the process which comprises reacting the corresponding carboxylic acid esters having the general formula:

$$R-CO-OR' \qquad (II)$$

in which R is the same as defined above, and R' represents a lower alkyl radical, especially a methyl, ethyl, propyl or butyl radical, with hydroxylamine or its salts in the presence of an alkali metal alcoholate, preferably sodium methylate, sodium ethylate or potassium methylate, and in the presence of excess alcohol.

The reaction can be carried out within a fairly wide range of temperature. In general, the operation is carried out substantially between about 10 and 60° C., preferably between about 15 and 30° C.

To carry out the reaction, the reaction components are generally used in approximately equimolar proportions. When a salt of hydroxylamine is used, instead of hydroxylamine itself, then the alkali metal alcoholate is used in such an amount that the liberated acid of the hydroxylamine salt is completely neutralized. Working up of the reaction mixture is carried out in the usual manner.

Hence, the instant hydroxamic acids surprisingly have a strong fungicidal activity. Advantageously, because of their low toxicity towards warm-blooded animals, they are eminently suitable for combatting undesirable fungus growth. The good compatibility of the instant compounds with higher plants allows them to be used very effectively as plant protective agents against fungus diseases.

The instant hydroxamic acids are especially effective against fungi which are transferred by seeds, such as *Tilleta tritici* and *Ustilago avenae,* but also against fungi living in the soil, such as Pythium species, Phytophthora species and *Thielaviopsis basicola,* and the like.

Thus, the particular compounds of the instant invention can be used as fungicides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonate, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, such as other fungicides, insecticides, acaricides, nematocides, fertilizers, and agents which improve the structure of the soil, if desired.

The substances according to the invention may be employed by themselves as the artisan will appreciate, in the form of their salts, particularly their alkali metal salts, such as the sodium salt and the potassium salt, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.1 and 50% by weight, and preferably 3 and 30% by weight, of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.1 and 95% by weight, and preferably 0.1 and 50% by weight, of the mixture.

Furthermore, the present invention contemplates methods of selectively controlling and combatting fungi, which comprise applying to at least one of (a) such fungi and (b) their habitat, a fungicidally effective amount of the particular compound of the invention alone or together with a carrier vehicle as noted above. The instant formulations or compositions are applied in the usual manner, for example, by spraying, atomizing, vaporizing, scattering, dusting, watering, sprinkling, pouring, dry-dressing, slurry-dressing moist-dressing, wet-dressing, and the like.

In particular, the concentration of the active compound of the invention which is utilized with the carrier vehicle will depend upon the intended application, as the artisan will appreciate. In special cases, however, it is possible to go above or to go below such range of concentration. In the case of seed dressing, substantially between about 10 mg. and 10 g, and preferably 100 mg. to 3 g., of the particular active compound are used generally per kilogram of seeds to be dressed.

The following examples are given for the purpose of illustrating, without limiting, the utility of the compositions according to the present invention:

EXAMPLE 1

Agar plate test

Test for fungitoxic activity and breadth of activity spectrum.

Solvent:
(a) 1000 parts by weight acetone.
(b) 100 parts by weight acetone.

To produce a suitable preparation of the particular active compound, 1 part by weight of such active compound is dissolved in the stated amount of solvent, i.e. either amount (a) or amount (b) above.

The preparation of the given active compound is added to potato dextrose agar which has been liquefied by heating, in a quantity sufficient to ensure that the desired concentration of active compound results. After thorough shaking to achieve a uniform dispersion of the active compound, the agar is poured into petri dishes under sterile conditions. When the mixture of agar substrate and active compound has solidified, test fungi from pure cultures are placed thereon in small discs of 5 mm. diameter. The petri dishes are incubated for 3 days at 20° C.

After this period of time, the inhibiting action of the given active compound on the mycelium growth is determined in categories, taking into account the untreated control:

0 means that no mycelium growth occurred either on the treated substrate or on the inoculum;

− means mycelium growth occurred only on the inoculum with no growing over onto the treated substrate taking place; and + means mycelium growth extended from the inoculum onto the treated substrate, similar to the growing over onto the untreated substrate in the control test.

The active compounds, their concentrations, the test fungi, and the inhibition effects achieved can be seen from the following Table 1:

TABLE 1.—AGAR PLATE TEST

| Active compound | Concentration of active compound in substrate mg./liter | Thielaviopsis basicola | Phytophthora cactorum |
| --- | --- | --- | --- |
| (D) $(CH_3)_3$—C—CO—NH—OH—Cu (known) | (b) 100 | + | + |
| (III) 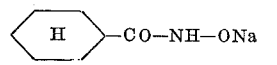—CO—NH—OH | (a) 10<br>(b) 100 | 0<br>0 | 0<br>0 |

EXAMPLE 2

Seed dressing test/loose smut of oats (seed-born mycosis)

To produce a suitable dry dressing, the particular active compound is extended with a mixture of equal parts by weight of talc and kieselguhr to give a finely powdered mixture or dressing having the desired concentration of active compound.

To apply the dressing, oat seed, which is naturally infested with loose smut (*Ustilago avenae*), is shaken with the dressing in a closed glass flask. Two batches of 100 grains of seed are sown 2 cm. deep in seed boxes containing a mixture of 1 part by volume of Fruhstorfer standard soil and 1 part by volume of quartz sand. The boxes are placed in a greenhouse at a temperature of about 18° C., kept normally moist and exposed to light for 16 hours daily. After 10–12 weeks, the oats flower and show healthy and diseased panicles (blighted panicles).

After this time, the number of diseased panicles is determined as a percentage of the total number of developed panicles: 0% means that no diseased panicles are present, whereas 100% means that all the panicles are diseased. Thus, the fewer diseased panicles that are formed, the more effective is the active compound.

The active compounds, their concentrations in the dressing, the amount of dressing applied and the number of diseased panicles can be seen from the following Table 2:

TABLE 2.—SEED DRESSING TEST/LOOSE SMUT OF OATS

| Active compound | Concentration of active compound in dressing, percent by weight | Amount of dressing applied, g./kg. seed | Number of smutted panicles, percent of total number of developed panicles |
| --- | --- | --- | --- |
| Untreated control | | | 36.7 |
| (C) $CH_3$—O—$CH_2$—$CH_2$—Hg—$(SiO_2)_n$ (known) | 5.25 | 3 | 1.1 |
| (III') 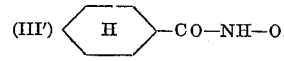—CO—NH—OH | 10<br>30 | 3<br>3 | 0.0<br>0.0 |
| (IV) 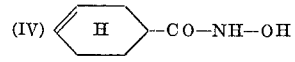—CO—NH—OH | 10<br>30 | 3<br>3 | 1.1<br>0.0 |
| (V) 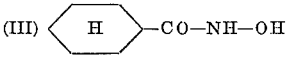—CO—NH—OH | 10<br>30 | 3<br>3 | 3.3<br>0.0 |
| 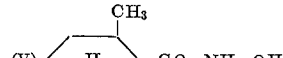—CO—NH—ONa | 10<br>30 | 3<br>3 | 0.0<br>0.0 |

EXAMPLE 3

Seed dressing test/bunt of wheat (seed-born mycosis)

To produce a suitable dry dressing, the particular active compound is extended with a mixture of equal parts by weight of talc and kieselguhr to give a finely powdered mixture or dressing having the desired concentration of the given active compound.

Wheat seed is contaminated with 5 g. of the chlamydospores of *Tilletia tritici* per kg. of seed. To apply the dressing, the seed is shaken with the dressing in a closed glass flask. The seed is placed on moist loam under a cover of one layer of muslin and 2 cm. of moderately moist compost soil and kept for 10 days in a refrigerator at 10° C. under optimum germination conditions for the spores.

The germination of the spores on the wheat grains, each of which is contaminated with about 100,000 spores, is subsequently determined microscopically. The smaller the number of spores which have germinated, the more effective is the particular active compound.

The active compounds, their concentration in the dressing, the amount of dressing applied and the percentage spore germination can be seen from the following Table 3:

TABLE 3.—SEED DRESSING TEST/BUNT OF WHEAT

| Active compound | Concentration of active compound in dressing, percent by weight | Amount of dressing applied, g./kg. seed | Spore germination, percent |
| --- | --- | --- | --- |
| Untreated control | | | [1] 100 |
| (E) $CH_3$—CH=CH—CH=CH—CO—NH—OH (known) | 30 | 1 | 5.0 |
| (V') 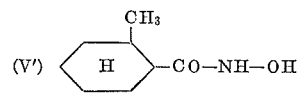—CO—NH—OH | 30 | 1 | 0.5 |

[1] (Approximately.)

EXAMPLE 4

Soil treating agent/*Pythium ultimum*

To produce a suitable preparation of the particular active compound, the active compound is extended with talc to a content of 5%, and subsequently with quartz sand to a content of 0.5% of active compound.

The resulting preparation of the given active compound is homogeneously mixed with naturally infested compost soil; when wrinkled peas are sown in such soil, this is known to lead to high losses among the seedlings, due to *Pythium ultimum*. The soil is filled into five pots, each of which is sown with 10 seeds (i.e. peas) of the host plant. The pots are placed in a greenhouse at 15–18° C. and kept normally moist.

Three weeks after sowing, the number of healthy plants is determined as a percentage of seeds sown: 0% means that no healthy plants have grown, whereas 100% means that healthy plants have resulted from all the seeds.

The active compounds, their concentration in the soil and the results obtained can be seen from the following table:

TABLE 4.—SOIL TREATING AGENT TEST/*PYTHIUM ULTIMUM*

| Active compound | Concentration of active compound, mg./liter soil | Number of healthy plants, percent |
|---|---|---|
| Untreated control | | 0 |
| (A) Tetramethyl thiuram disulfide (known) | 100 | 20 |
| (B) Zinc-ethylene-1,2-bis-dithiocarbamate (known) | 100 | 16 |
| (III'') 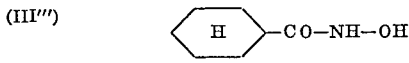 | 100 | 38 |

For purposes of illustration, the production of hexahydrobenzohydroxamic acid is described in greater detail by the following:

EXAMPLE 5

(III''') 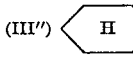

21 grams of hydroxylamine hydrochloride are mixed with a solution of 7 g. of sodium in 75 ml. of methanol. 47 grams of methyl hexahydrobenzoate are run into this solution at room temperature. The temperature thereby rises by about 5° C. Stirring is continued for 30 minutes. A solution of 7 g. of sodium in 75 ml. of methanol is again added and the mixture is filtered. After acidification, the filtrate yields about 30 g. of hexahydrobenzohydroxamic acid; M.P. 110–113° C.

EXAMPLE 6

In the same way, using corresponding molar amounts of hydroxylamine hydrochloride and the following starting materials:

(a) ethyl-(3-isopropoxy)-hexahydrobenzoate;
(b) methyl-(2,5-endomethylene-6-butanoyloxy)-hexahydrobenzoate (i.e. methyl-(3-butanoyloxy)-bicyclo-[2,2,1]-hept-2-anoate); and
(c) isopropyl-(4-hydroxy)-hexahydrobenzoate, the respective final products are obtained:

(a') 3-isopropoxy-hexahydrobenzohydroxamic acid;
(b') 2,5-endomethylene-6-butanoyloxy-hexahydrobenzohydroxamic acid (i.e. 3-butanoyloxy-bicyclo-[2,2,1]-hept-2-anohydroxamic acid); and
(c') 4-hydroxy-hexahydrobenzohydroxamic acid.

Among the preferred compounds usable in accordance with the present invention are the following:

(III) Hexahydrobenzohydroxamic acid having the formula:

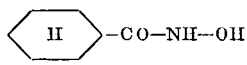

and the sodium salt.

(IV) Tetrahydrobenzohydroxamic acid having the formula:

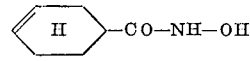

(V) Hexahydro-ortho-toluyl-hydroxamic acid having the formula:

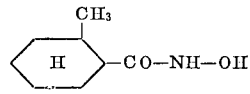

(VI) 2,5 - endomethylene-tetrahydrobenzoxamic acid (i.e. bicyclo-[2,2,1]-hept-2-anohydroxamic acid) having the formula:

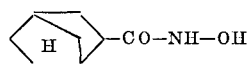

(VII) Hexahydro - 4 - methoxy-benzohydroxamic acid having the formula:

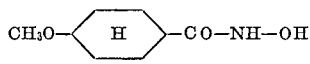

(VIII) Hexahydro - 2 - acetoxy-benzohydroxamic acid having the formula:

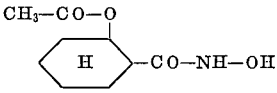

(IX) 2 - hydroxy-5-tert.-butyl-hexahydrobenzohydroxamic acid having the formula:

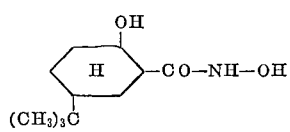

Advantageously, in accordance with the present invention, in the foregoing formulae:

R represents hydroaromatic hydrocarbon containing 6–7 ring carbon atoms, such as cyclohexyl, cyclohex-3-enyl, bicyclo(2,2,1)hept-2-yl, and the like, especially cycloalkyl having 6 ring carbon atoms and cycloalkenyl having 6 ring carbon atoms and bicyclo(2,2,1)heptyl, i.e. $C_6$-hydroaromatic hydrocarbon containing an endomethylene bridge; which may be substituted with alkyl having 1–4 carbon atoms, such as methyl, ethyl, n-propyl, isopropyl, n-butyl, iso-butyl, sec.-butyl, tert.-butyl, and the like; alkoxy having 1–4 carbon atoms, such as methoxy, ethoxy, n-propoxy, isopropoxy, n-butoxy, isobutoxy, sec.-butoxy, tert.-butoxy, and the like; alkanoyloxy having 1–4 carbon atoms such as formoyl or methanoyloxy acetoxy, propanoyloxy, butanoyloxy, and the like, and especially alkanoyloxy having the formula R'—COO—, in which R' is an alkyl radical having 1–3 carbon atoms; and hydroxy.

Preferably, where such alkyl, alkoxy, alkanoyloxy, or hydroxy substituents are present, the same are present in any of the 2-, 3-, 4-, 5- or 6- positions of the cyclohexyl ring and even of the bicycloheptyl ring, apart from the endomethylene bridge carbon atom.

All of the foregoing compounds in accordance with the present invention possess the desired strong fungicidal properties, with regard to a broad spectrum of activity, enabling such compounds with a concomitant low toxicity toward warm-blooded creatures and corresponding favorable compatibility with plants to be used more effectively to control and/or eliminate fungi by application of such compounds to the fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Method of combatting fungi which comprises applying to said fungi, a fungitoxic amount of a hydroaromatic hydroxamic acid having the formula:

in which R represents a member selected from the group consisting of hydroaromatic hydrocarbon containing 6–7 ring carbon atoms and substituted hydroaromatic hydrocarbon containing 6–7 ring carbon atoms which is substituted with a member selected from the group consisting of alkyl having 1–4 carbon atoms, alkoxy having 1–4 carbon atoms, alkanoyloxy having 1–4 carbon atoms and hydroxy, and X is selected from the group consisting of hydrogen, sodium and potassium.

2. Method according to claim 1 wherein said compound is selected from the group consisting of:

tetrahydrobenzohydroxamic acid;
hexahydrobenzohydroxamic acid;
2,5-endomethylene-tetrahydrobenzohydroxamic acid;
hexahydro-ortho-toluyl-hydroxamic acid;
hexahydro-4-methoxy-benzohydroxamic acid;
hexahydro-2-acetoxy-benzohydroxamic acid; and
2-hydroxy-5-tert.-butyl-hexahydrobenzohydroxamic acid.

3. Method according to claim 1 wherein said compound is tetrahydrobenzohydroxamic acid having the formula:

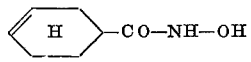

4. Method according to claim 1 wherein said compound is hexahydrobenzohydroxamic acid having the formula:

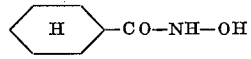

5. Method according to claim 1 wherein said compound is 2,5-endomethylene-tetrahydrobenzohydroxamic acid having the formula:

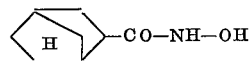

6. Method according to claim 1 wherein said compound is hexahydro-ortho-toluyl-hydroxamic acid having the formula:

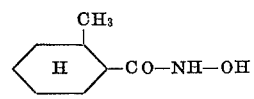

7. Method according to claim 1 wherein said compound is hexahydro-4-methoxy-benzohydroxamic acid having the formula:

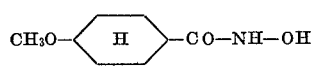

8. Method according to claim 1 wherein said compound is hexahydro-2-acetoxy-benzohydroxamic acid having the formula:

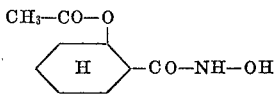

9. Method according to claim 1 wherein said compound is 2-hydroxy-5-tert.-butyl hexahydrobenzohydroxamic acid having the formula:

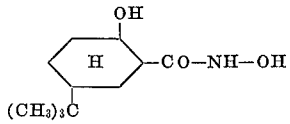

10. Method according to claim 1 wherein said compound is used in the form of a mixture with a dispersible carrier vehicle, said compound being present in an amount between about 0.1 and 50% by weight of the mixture.

11. Method of combatting fungi on seeds which comprises applying to said fungi on seeds a dressing containing a fungitoxic amount, between about 10 mg. and 10 g. per kilogram of seeds, of a hydroaromatic hydroxamic acid having the formula:

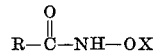

in which R represents a member selected from the group consisting of hydroaromatic hydrocarbon containing 6–7 ring carbon atoms and substituted hydroaromatic hydrocarbon containing 6–7 ring carbon atoms which is substituted with a member selected from the group consisting of alkyl having 1–4 carbon atoms, alkoxy having 1–4 carbon atoms, alkanoyloxy having 1–4 carbon atoms and hydroxy, and X is selected from the group consisting of hydrogen, sodium and potassium.

References Cited

UNITED STATES PATENTS

| 2,975,042 | 3/1961 | Summers | 44—50X |
| 2,397,508 | 4/1946 | Rouault et al. | 260—500.5 |

FOREIGN PATENTS

| 744,307 | 2/1956 | Great Britain | 260—500.5H |
| 1,332,149 | 6/1963 | France | 260—500.5 |

ALBERT T. MEYERS, Primary Examiner

L. S. HENKMAN, Assistant Examiner

U.S. Cl. X.R.

260—500.5; 424—315